US006540104B1

(12) United States Patent
Yanagita et al.

(10) Patent No.: US 6,540,104 B1
(45) Date of Patent: Apr. 1, 2003

(54) INTEGRAL PNEUMATIC DISPENSER AND METHOD FOR CONTROLLING SAME

(75) Inventors: Akihiro Yanagita, Orion, MI (US); Douglas L. Potts, Goodrich, MI (US); Raymond J. Guzowski, Fenton, MI (US)

(73) Assignee: Fanuc Robotics North America, Inc., Rochester Hills, MI (US)

( * ) Notice: Subject to any disclaimer, the term of this patent is extended or adjusted under 35 U.S.C. 154(b) by 234 days.

(21) Appl. No.: 09/608,762

(22) Filed: Jun. 30, 2000

(51) Int. Cl.[7] .............................................. G01F 11/00

(52) U.S. Cl. .......................... 222/1; 222/61; 222/145.1; 222/386; 222/389

(58) Field of Search ............................ 222/1, 61, 135, 222/145.1, 190, 386, 389

(56) References Cited

U.S. PATENT DOCUMENTS 4,493,435 A * 1/1985 Hartley ...................... 137/113
4,527,954 A 7/1985 Murali et al. ................. 417/46
4,701,112 A 10/1987 Eisenhut et al. ............ 417/345
4,858,172 A 8/1989 Stern .......................... 364/160
5,277,333 A * 1/1994 Shimano ...................... 222/14
5,435,462 A * 7/1995 Fujii ....................... 222/144.5
5,655,896 A 8/1997 Konieczynski .............. 417/426
5,823,389 A 10/1998 Guzowski ...................... 221/1

* cited by examiner

*Primary Examiner*—Joseph A. Kaufman
(74) *Attorney, Agent, or Firm*—Bliss McGlynn, P.C.

(57) ABSTRACT

A method is disclosed for providing a steady transition state for an integral pneumatic dispensing system that is related to a robot. The method dispenses a single material using a pneumatic dispensing system having a single output including first and second shotmeters having first and second meters, first and second encoders and first and second pressure transducers. The method includes the step of loading the first shotmeter with the material. Once loaded, a pressure is applied to the material. The material is then dispensed out of the first shotmeter by forcing the material through the single output. Once the material in the first shotmeter is dispensed to a predetermined volume, the method begins to transition the flow of material from the first shotmeter to the second shotmeter. The transition includes the control of the volume being dispensed and the pressure applied to the material. By controlling both the volume and the pressure of the material, the transition between the two shotmeters is smooth allowing for uninterrupted production. In addition, the volume of material being applied can be better monitored reducing the number of times the production has to stop due to inadvertently running out of material.

11 Claims, 4 Drawing Sheets

FIG 2
PRIOR ART
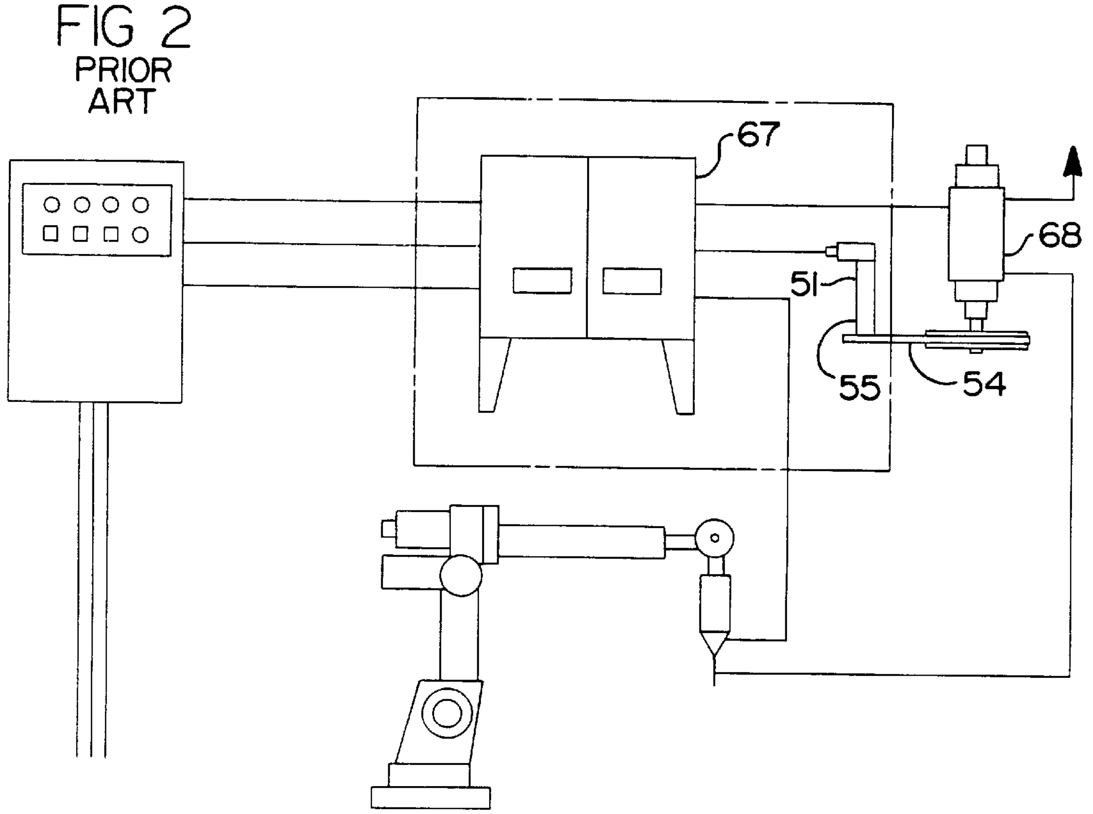
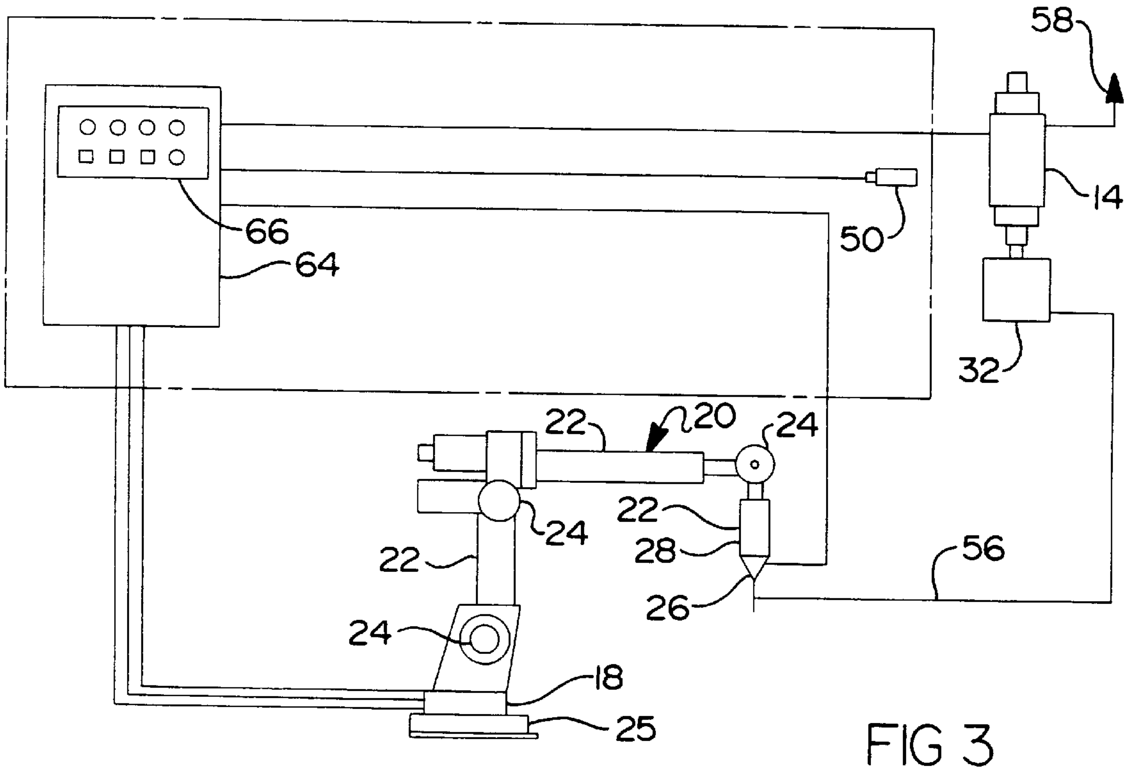
FIG 3

INTEGRAL PNEUMATIC DISPENSER AND METHOD FOR CONTROLLING SAME

BACKGROUND OF THE INVENTION

1. Field of the Invention

The invention relates to pneumatic controls for dispensing materials at the end of a robot arm. More specifically, the invention relates to an integral pneumatic control system and a method for controlling same to eliminate fluctuations in material flow rates.

2. Description of the Related Art

The manufacture of goods can often require the application of viscous materials. These materials may be used to paint, seal, coat, adhere, weld and the like. The material must be applied in a uniform and automated fashion. In many instances, the material is directed by a robot that has been programmed to apply materials to the items being manufactured or treated.

Dispensing materials out of a gun at the end of a robot arm is difficult, especially as the viscosity of the material being applied grows. Dispensers that perform such tasks are large and incapable of being located at the end of a robot arm. Problems arise when the dispensers increase the cycle time of production merely because the reloading time required approaches the magnitude of minutes. Another issue relating to automatically dispensing material relates to inventory control. If control of the volume of material is not good, it will be difficult to determine when the system will need to be reloaded. Further, it will also be difficult to determine just how much material is required to complete a task for a particular piece or part.

One attempt to overcome the deficiencies in reloading dispensers is disclosed in U.S. Pat. No. 4,701,112, issued to Eisenhut et al. on Oct. 20, 1987. This reference discloses a pumping system having two fluid pumps. Two reed switches indicate a fully loaded reservoir and an empty reservoir. The reed switch configuration is found on each of the fluid pumps. As the fluid in one reservoir is emptied, a reed switch indicates this condition. It turns off the pump associated with that reservoir and turns the pump on for the other reservoir. This system is deficient because the switching between reservoirs occurs in an abrupt fashion. There is no moderate transition between the two reservoirs. If this pumping system were employed in an automated assembly line, some parts may pass the robot without receiving an adequate amount of the material or the application of the material will be uneven. In many application scenarios, this abrupt switch-over from one reservoir to another will not be acceptable.

SUMMARY OF THE INVENTION

A robot assembly is disclosed for applying a material to a part. The robot assembly includes a robot arm that is movable through a plurality of axes pursuant to a given set of instructions. The robot arm includes a plurality of elements, each separated by at least one joint. The robot arm extends between a base end and a distal end. A pneumatic dispensing system is used in conjunction with the robot arm for dispensing the material from the distal end of the robot arm onto the part. The pneumatic dispensing system controls the volume and speed at which the material is applied to the part. The robot arm determines where the material is applied with respect to the part. A robot controller controls the position, orientation and speed of movement of the robot arm with respect to the part as the robot arm moves through its designated motion. The robot controller also controls the volume of the material being applied to the part by the pneumatic dispensing system.

BRIEF DESCRIPTION OF THE DRAWINGS

Advantages of the invention will be readily appreciated as the same becomes better understood by reference to the following detailed description when considered in connection with the accompanying drawings, wherein:

FIG. 2 is a schematic view of a system used in the prior art;

FIG. 3 is a schematic view of one embodiment of the invention;

DETAILED DESCRIPTION OF THE PREFERRED EMBODIMENT(S)

Figure 1:
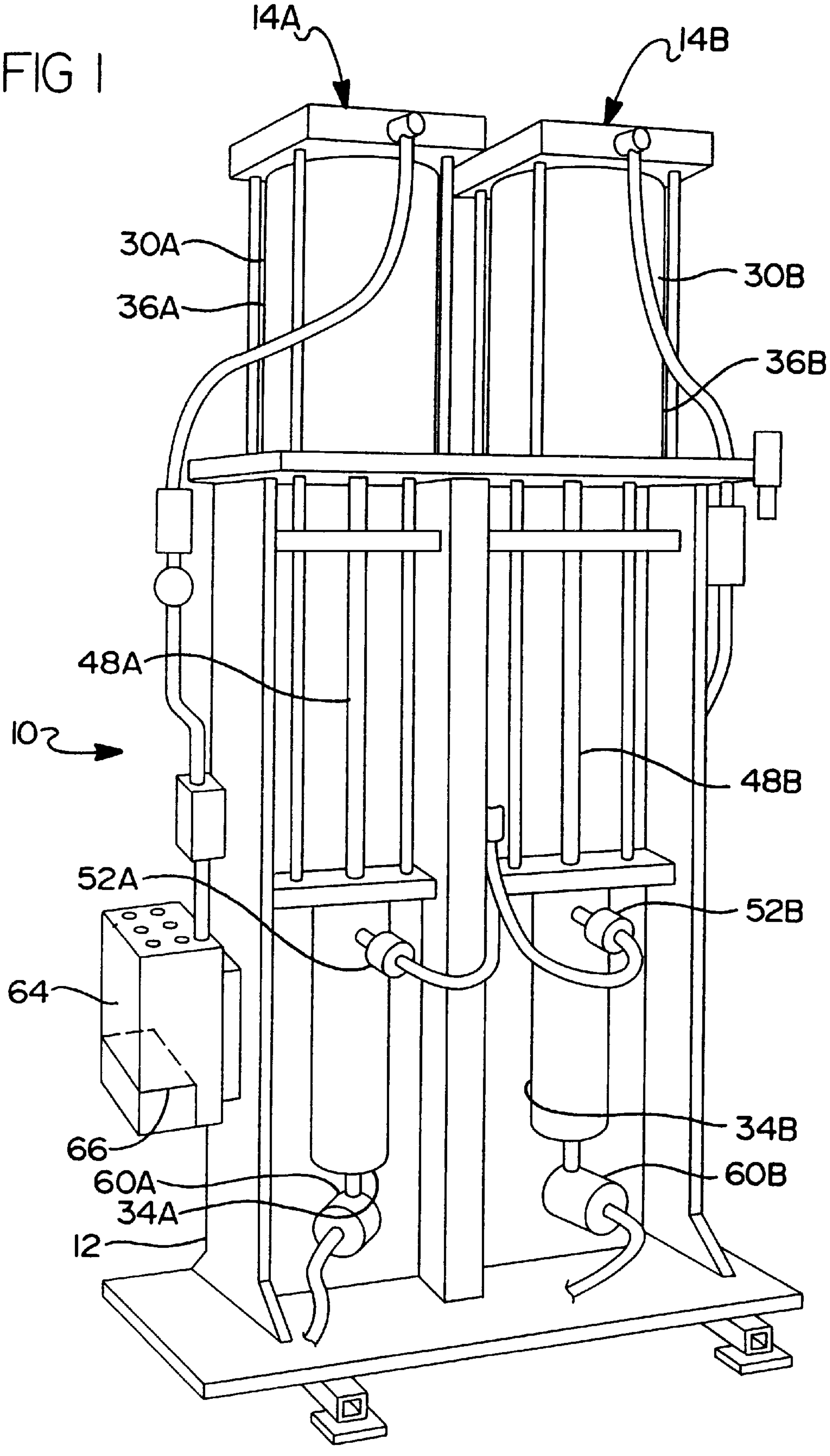
FIG. 1 is a perspective view of one embodiment of a shotmeter assembly according to the invention.
Figure 4:
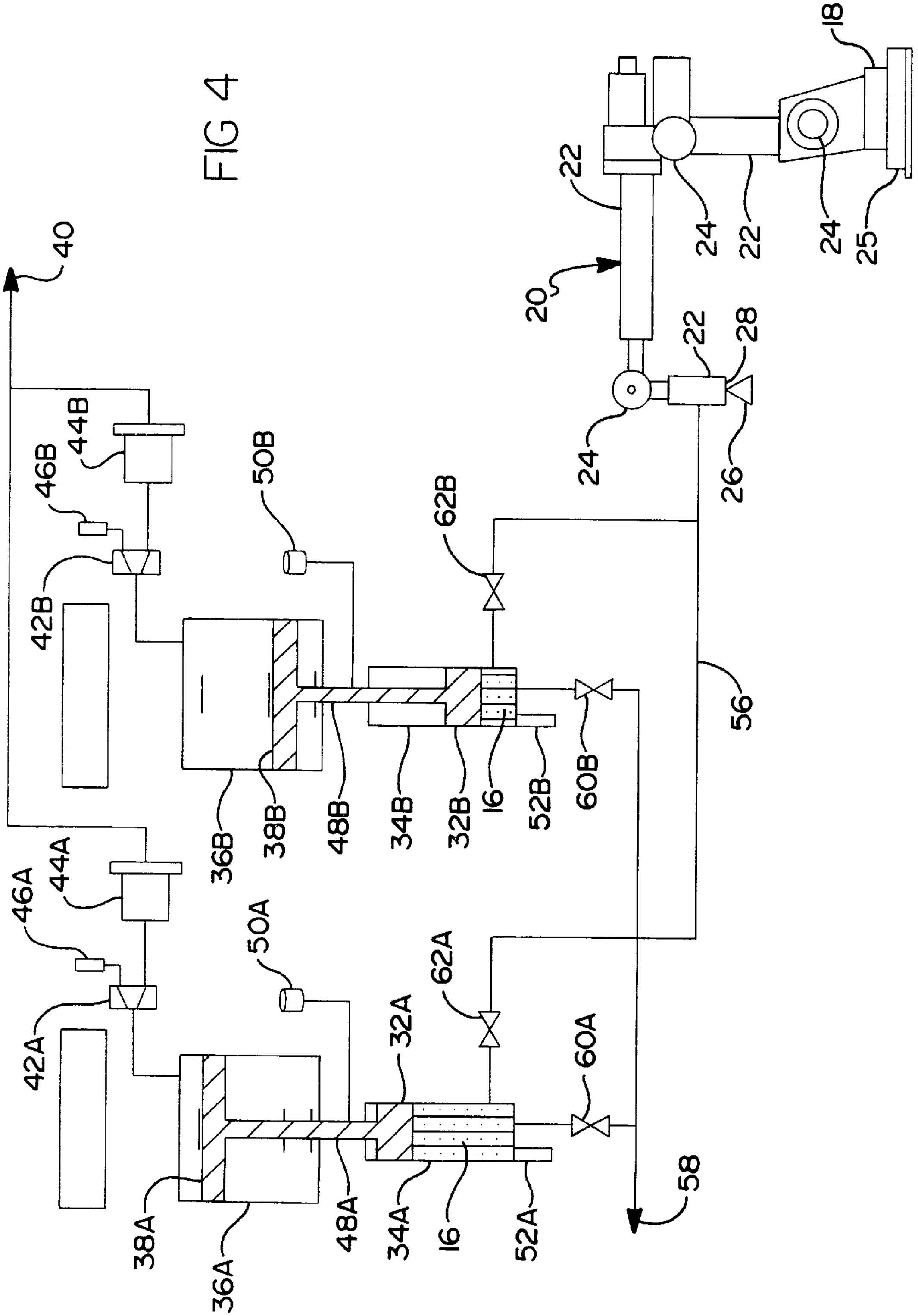
FIG. 4 is a second schematic view of one embodiment of the invention.

Referring to FIG. 1, an integral pneumatic dispenser system is generally indicated at 10. The integral pneumatic dispenser system 10 includes a frame 12 that houses two shotmeters 14 (the shotmeters 14 and their respective elements and associated elements will be differentiated in the Figures and in the specification using the letters A and B, when necessary). The function of each shotmeter 14 is to provide material 16 to be sprayed or otherwise applied to a piece wherein the piece is located at the end of a robot 18. The robot 18 is best seen in FIGS. 3 and 4. The robot 18 includes a robot arm 20 including a plurality of elements 22, each of which is separated by a joint 24. The robot arm 20 extends up from a base end 25. The robot arm 20 is movable through a number of axes allowing it to move to the desired position with respect to the part being coated or treated and to obtain the proper orientation with respect thereto. A dispensing outlet 26 is disposed at a distal end 28 of the robot arm 20. In the embodiment shown in the Figures, the dispensing outlet 26 is a spray gun. It should be appreciated by those skilled in the art that any type of dispensing outlet 26 may be used depending on the application parameters and the material 16 being applied, a list of which may include, but are not limited to, sealant, paint, adhesive, weld material, caulk and the like.

Each shotmeter 14 includes a pneumatic drive 30. The pneumatic drives 30 operate independently of each other. Each pneumatic drive 30 forces the movement of a material plunger 32 within a material cylinder 34. The material cylinders 34 fill with the material 16 when the material plunger 32 moves upwardly inside the material cylinder 34. The material cylinders 34 also condition the material 16 depending on the type of material 16 being applied. In many instances, the material cylinders 34 will have to condition the material 16 by changing and/or maintaining its temperature.

The pneumatic drives 30 each include a meter cylinder 36 and a meter plunger 38. The meter cylinders 36 are connected to a fluid source 40 through an air valve 42 and a pressure regulator 44. The air valves 42 vent to atmosphere via vents 46.

When pressurized air from the air supply 40 enters the meter cylinders 36, they force the meter plungers 38 downwardly. A cylinder rod 48 connects the meter plunger 38 to the material plunger 32 inside the material cylinder 34. Therefore, the material plunger 32 moves in direct relation with the meter plunger 38.

An encoder 50 is disposed adjacent each of the meter cylinders 36. The encoders 50 replace the slide wire transducer 51 of the prior art. The slide wire transducer 51 includes a contact 53 that moves along a slide 55 to determine the position and content of the shotmeters 14.

The encoders 50 detect the position of the cylinder rods 48 with respect to the meter cylinder 36. The encoders 50 identify the position of the material plungers 32 with respect to their respective material cylinders 34. A calculation of the volume of material 16 stored within the material cylinder 34 can be made by calculating the distance the material plunger 32 is from the bottom of the material cylinder 34 and multiplying that distance by the cross-sectional area of the material cylinder 34. The calculation identifies the volume of material 16 stored within the material cylinders 34 at any instant during the process.

Secured to a lower portion of each of the material cylinders 34 is a pressure transducer 52. The pressure transducers 52 translate the pressure within the material cylinders 34 into an electrical signal corresponding to the pressure being applied to the material 16 within the material cylinder 34, to be discussed in greater detail subsequently.

Each of the material cylinders 34 includes an inlet line 54 and an outlet line 56. The inlet line 54 provides fluid communication between the material cylinders 34 and a material supply 58 from which the material 16 is supplied. The outlet line 56 provides fluid communication between the material cylinders 34 and the dispensing outlet or spray gun 26. Each of the lines 54, 56 have an inlet valve 60 and an outlet valve 62, respectively, for each of the material cylinders 34. The inlet 60 and outlet 62 valves control when the material cylinders 34 are being charged with and discharged of material 16.

A robot controller 64 controls the position, orientation and speed of movement of the robot arm 20 and all of its elements 22. The elements 22 move with respect to each other and the base end 25 thereof. Historically, the robot controller 64 has been dedicated solely to this function as position and speed are the most important aspects of a robot 18. In the invention, however, the robot controller 64 also receives input signals and generates output signals to operate the integral pneumatic dispenser system 10.

More specifically, the robot controller 64 controls the volume of the material 16 being applied to the part by the integral pneumatic dispenser system 10. The robot controller 64 includes a monitor 66 for monitoring the position of the shotmeters 14 as the material 16 is simultaneously transferred from both shotmeters 14 to the dispensing outlet 26 located at the distal end 28 of the robot arm 20. The robot controller 64 receives input from the encoders 50 and the pressure transducers 52 to determine the amount of material 16 within the material cylinders 34 and the pressure being applied thereto. Based on that information, the robot controller 64 controls the charging and discharging of the material 16 by controlling the air valves 42, pressure regulators 44, inlet valves 60 and outlet valves 62. The actual control of these elements will be discussed subsequently.

In operation, the primary function of the integral pneumatic dispenser system 10 is to dispense the material 16 through a single output, i.e., the dispensing outlet 26. Using an integral pneumatic dispenser system 10 that includes two shotmeters 14 requires the robot controller 64 to control the shotmeters 14 with respect to each other. As may be seen in FIG. 2, the prior art required an independent controller 67 to control the activity of a pneumatic dispenser system 68.

The relationship of the two shotmeters 14 and how they are controlled results from the requirement that the material 16 flowing out of the dispensing outlet 26 must remain at a constant amount over time to ensure even application of the material 16 on the part or work piece.

Therefore, a method for dispensing the material 16 must be incorporated to ensure the desired even application is made. The method according to the invention includes operating the shotmeters 14 through five modes; shut-off, pressurized, transition, reload and relieve. These modes will be presented throughout the remainder of the discussion.

When initiating the method, the first shotmeter 14A is loaded. This is the step of pressurizing the first shotmeter 14A. This is done by opening the inlet valve 60A allowing the material 16 to flow into the material cylinder 34A. Once full as determined by the encoder 50A, the inlet valve 60A is closed and the pressure regulator 44A is activated to allow the air supply 40 to apply a predetermined force to the material 16 inside the material cylinder 34A. The pressure transducer 52A measures the pressure being applied to the material 16 within the material cylinder 34A and provides a shut off signal to the pressure regulator 44A when the pressure reaches the predetermined pressure. The cycle time for loading the shotmeters 14 is approximately three minutes. Therefore, the second shotmeter 14B is required to eliminate any downtime in the production by loading the second shotmeter 14B while the first shotmeter 14A is dispensing.

Once the pressure and volume requirements are met by the first shotmeter 14A, the first shotmeter 14A dispenses the material 16 by opening the outlet valve 62A to allow the material 16 to flow through the outlet line 56A and out the dispensing outlet 26. This output can be tracked when viewing the meter position for shotmeter 14A in FIG. 5 as it moves between points 1 and 2.

During this time, the second shotmeter 14B is being loaded in the same fashion as the first shotmeter 14A (described above). Once the second shotmeter 14B has been filled with the material 16, pressure is applied to the material 16 through the pressure regulator 44. By the time the first shotmeter 14A has dispensed the majority of the material 16 stored therein, the second shotmeter 14B has been filled and pressurized and is capable of providing the material 16 necessary to continue coating the parts passing by the distal end 28 of the robot arm 20 without having to stop production in order to recharge the first shotmeter 14A.

It is at this time that the integral pneumatic dispenser system 10 enters the transition phase. The transition phase occurs when the integral pneumatic dispenser system 10 must switch its source of material from the first shotmeter 14A to the second shotmeter 14B (and, when appropriate, vice versa). It is important at this stage of the process to maintain control over the flow of material 16 as it comes from both the first shotmeter 14A and the second shotmeter 14B. If there is an interruption in the flow of material 16, the quality of the part being coated will be compromised. Further, when disruptions or irregularities in the flow of the material 16 occur, inaccurate information as to the quantities of material 16 being consumed by the process will be generated. This will create inventory problems and unnecessarily stop production due to miscalculations of time as to when the supply of material 16 would need to be refilled.

Figure 5:
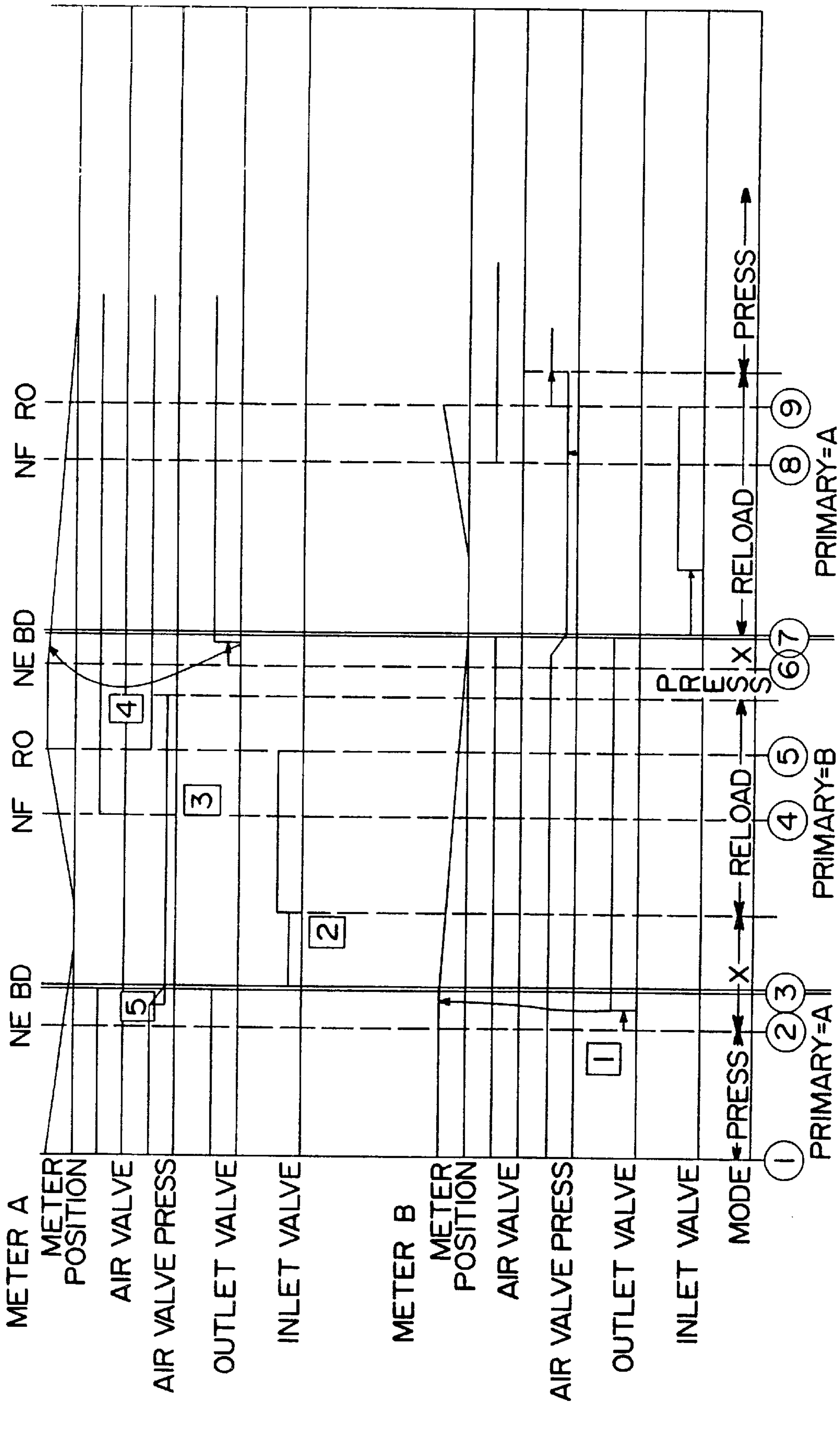
FIG. 5 is a timing chart used by one embodiment of the invention.

The transition phase and the other phases may be graphically viewed when reviewing FIG. 5. In this graph, the outputs and inputs are mapped to show exactly how the material flow from each of the shotmeters 14 is affected. By way of illustration, it can be seen that the meter position for the first shotmeter 14A changes when the inlet valve 60A changes state. Once the position of the meter reaches a near fall state, the inlet valve 60A changes state, i.e., it closes. The outlet valve 62A subsequently opens and the position of the meter is reduced due to the dispensing of the material 16 that was being temporarily stored in the shotmeter 14A. By superimposing the meter position of the first shotmeter 14A over the meter position of the second shotmeter 14B, it can be seen that the flow of material 16 out of the dispensing outlet 26 is substantially constant due to the ability to transition the output of the respective shotmeters 14 between each other.

The first step in the transition phase is to open the outlet valve 62B for the second shotmeter 14B. Once completed, the pressure regulator 44A begins to reduce the amount of pressure being applied to the material 16 found in the first shotmeter 14A. At this time, the air valve 42A relieves pressure also. The pressure regulator 44A of the first shotmeter 14A is pressurized at this time to cushion the pressure applied to the material 16 being dispensed from the dispensing outlet 26 when the second shotmeter 14B is capable of supplying the material 16 at the dispensing outlet 26. At the desired pressure, the outlet valve 62A is closed.

At the end of the transition period, the second shotmeter 14B is the primary shotmeter supplying material 16 to the dispensing outlet 26. The first shotmeter 14A has become the secondary shotmeter and begins its reload phase. During this time, the pressure applied to the first shotmeter 14A is reduced allowing material 16 to enter the material cylinder 34 the of the inlet line 54 while the inlet valve 60A is open. While the first shotmeter 14A is in the reload phase, the second shotmeter 14B is in the pressurized phase allowing it to dispense the material 16 found therein.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A method for dispensing a single material using a pneumatic dispensing system having a single output including first and second shotmeters having first and second meters, first and second encoders and first and second pressure transducers, the method including the steps of:

loading the first shotmeter with the material;

applying a pressure to the material within the first shotmeter;

dispensing the material out of the first shotmeter by forcing the material through the single output;

loading the second shotmeter with the material during the step of dispensing the material out of the first shotmeter;

applying a pressure to the material within the second shotmeter;

measuring the volume of the material remaining in the first shotmeter;

dispensing the material out of the second shotmeter by forcing the material through the single output; and decreasing the pressure applied to the material within the first shotmeter during the step of dispensing the material out of the second shotmeter.

2. A method as set forth in claim 1 including the step of applying a pressure to the material within the second shotmeter.

3. A method as set forth in claim 2 wherein the step of applying the pressure to the material within the second shotmeter includes the step of increasing the pressure to the material within the second shotmeter during the step of decreasing the pressure to the material within the first shotmeter.

4. A method as set forth in claim 3 wherein the step of decreasing the pressure to the material within the first shotmeter includes the step of incrementally reducing pressure generated by a pressure regulator in fluid communication with the first shotmeter.

5. A method as set forth in claim 4 wherein the step of decreasing the pressure to the material within the first shotmeter also includes the step of relieving pressure through an air valve in fluid communication with both the pressure regulator and the first shotmeter.

6. A method as set forth in claim 5 including the step of closing an outlet valve once the pressure in the first shotmeter is reduced to a predetermined amount.

7. A method as set forth in claim 6 including the step of reloading the first shotmeter after the pressure in the first shotmeter has been reduced to zero.

8. A method as set forth in claim 7 including the step of pressurizing the first shotmeter after the step of reloading the first shotmeter has been completed.

9. A method as set forth in claim 8 wherein the step of applying the pressure to the material within the second shotmeter begins after the first meter measures a near empty state of the first shotmeter.

10. A method as set forth in claim 9 including the step of metering the volume of the material inside the second shotmeter.

11. A method as set forth in claim 10 wherein the step of applying pressure to the material within the second shotmeter begins after the step of metering determines the second shotmeter is filled to a predetermined amount.

* * * * *

UNITED STATES PATENT AND TRADEMARK OFFICE

CERTIFICATE OF CORRECTION

PATENT NO. : 6,540,104 B1 
DATED : April 1, 2003
INVENTOR(S) : Akihiro Yanagita, Douglas L. Potts and Raymond J. Guzowski It is certified that error appears in the above-identified patent and that said Letters Patent is hereby corrected as shown below:

Column 2,
Line 63, "fluid source 40" should read -- fluid source or air supply 40 --.

Signed and Sealed this

Twenty-third Day of September, 2003

JAMES E. ROGAN
*Director of the United States Patent and Trademark Office*